United States Patent [19]
Ruffolo et al.

[11] Patent Number: 6,041,288
[45] Date of Patent: Mar. 21, 2000

[54] METHOD AND APPARATUS FOR EVALUATING POWER EQUIPMENT

[75] Inventors: Ralph A. Ruffolo, Somerdale, N.J.; John A. Sinerchio, Fresno, Calif.

[73] Assignee: AT&T Corp., New York, N.Y.

[21] Appl. No.: 09/009,081

[22] Filed: Jan. 20, 1998

[51] Int. Cl.[7] .................................................. G07B 17/02
[52] U.S. Cl. ............................................ 702/184; 702/185
[58] Field of Search .................................. 702/184–185; 706/45, 46, 47, 911, 912, 916

[56] References Cited

U.S. PATENT DOCUMENTS

| | | | |
|---|---|---|---|
| 4,972,453 | 11/1990 | Daniel, III et al. | 379/10 |
| 5,040,123 | 8/1991 | Barber et al. | 364/149 |
| 5,123,017 | 6/1992 | Simpkins et al. | 714/26 |
| 5,260,868 | 11/1993 | Gupta et al. | 364/468.06 |
| 5,586,037 | 12/1996 | Gil et al. | 364/478.01 |

*Primary Examiner*—Marc S. Hoff
*Assistant Examiner*—Craig Steven Miller
*Attorney, Agent, or Firm*—Robert B. Levy; Susan E. McHale

[57] ABSTRACT

A technician evaluates each of the pieces (22, 24, 26 and 28) of building infrastructure equipment in a distribution network (18) by accessing a data base (34) to obtain a record (36$_i$) for the selected equipment piece. Each record contains an identification for the selected equipment piece as well as its operating tolerance specification. A comparison of the actual operating parameters to the operating tolerance specification reveals whether the piece of equipment is operating properly. Should the equipment have an operating parameter outside an acceptable range, the out-of-compliance data entry value is visually flagged and the impact of that piece of equipment on the network is assessed to determine the appropriate corrective action.

17 Claims, 3 Drawing Sheets

METHOD AND APPARATUS FOR EVALUATING POWER EQUIPMENT

TECHNICAL FIELD

This invention relates to a technique for evaluating elements of building infrastructure equipment, and specifically AC power distribution equipment, in a facility, such as a telecommunications central office, and for determining what action is necessary, based on such evaluation.

BACKGROUND ART

Providers of telecommunications services, such as AT&T, maintain various facilities, such as central offices, transmission hubs, and network operations centers, to name a few. Each such facility contains different types of telecommunications equipment, such as one or more switching systems, multiplexers, digital cross-connect systems, and/or transmission systems, for example. In addition to the various pieces of telecommunications equipment, each facility also contains various pieces of building infrastructure AC power equipment, such as transformers, switches, circuit breakers and the like. The pieces of AC power equipment collectively operate to provide power (typically, Alternating Current) to each piece of telecommunications equipment to enable such equipment to operate.

To ensure high reliability, each piece of telecommunications equipment in the facility must be maintained as well as each piece of power equipment. Failure to properly maintain even a single piece of power equipment, such as a circuit breaker or transformer, may cause that piece of equipment to fail prematurely. The failure of a single piece of power equipment may cause a loss of power to all or part of the telecommunications facility, causing all or part of the facility to fail. Depending on the volume of traffic carried by that facility, a loss of power can result in thousands, if not tens of thousands, of blocked calls, and a commensurate loss of revenue.

Some providers of telecommunications services do not undertake routine maintenance of power equipment, preferring to replace or repair such equipment upon failure. While this approach avoids the cost and effort associated with periodic inspection and maintenance, the loss of revenue associated with a single service outage often may exceed the savings achieved by not performing such maintenance. Moreover, even one service outage may severely damage the reputation of a telecommunications service provider regarding its reliability. To ensure high reliability and to minimize service outages, some providers of telecommunications service, such as AT&T, actively evaluate and maintain the power equipment in their facilities. In the past, such power equipment evaluation has proven cumbersome because of a lack of an organized approach towards tracking the status of each piece of equipment as well as an imprecise knowledge of whether each equipment piece is operating within the proper tolerances.

Thus, there is need for a technique for evaluating and maintaining the pieces of power equipment in a facility, and particularly, a telecommunications facility.

BRIEF SUMMARY OF THE INVENTION

Briefly, the present invention provides a method for evaluating the pieces of power equipment in a facility. In accordance with the method, a data base stores information, in the form of a record, about each piece of equipment, including an identification code as well as an operating tolerance specification, indicative of an acceptable range of operating parameters for that piece of equipment. In practice, the operating tolerance specification for each power equipment piece is derived from data provided by the manufacturer of that piece of equipment. A technician initiates evaluation of a piece of equipment by selecting the particular equipment piece and then accessing the corresponding record in the data base by matching the equipment identification label to the corresponding building and equipment identification number contained in a data base record. Thereafter, the technician enters test result data, and the system searches for and compares this test result data with the range of manufacturer specified, and/or Standards Organization (e.g. IEEE, NETA, NFPA, AT&T, etc.) recommended, operating parameters for the selected equipment. These data are stored on the system in user accessible tables. If the selected piece of equipment has at least one operating parameter that is outside the acceptable range, the technician is notified by the program immediately upon data entry (the program has determined that the data entry is out of compliance with the standard, and visually flags the data entry), and the perceived impact of such a deviation for the selected piece of equipment is assessed, with corrective action taken in accordance with this assessed impact. For example, if the selected piece of equipment exhibits a minor deviation of one of its operating parameters, and the impact of such a deviation is small, then the appropriate corrective action may simply entail repairing or replacing the selected equipment piece during a future scheduled maintenance interval. On the other hand, if the impact is major, then immediate notification, repair, or replacement may be necessary. In the case of a declared Level 1 trouble, the system guides the technician through the generation of an urgent action record (Record C), and corresponding Equipment Problem Report, which is to be immediately transmitted to a responsible party. In practice, the process of selecting a piece of equipment and performing the evaluation discussed above continues until each piece of equipment is selected and evaluated. Additionally, regarding equipment and building system evaluation, function buttons enable a grading of not only individual equipment elements but also the complete building AC power system (which is the average of all graded elements). The building grade (ranging from 1 to 4) is, by algorithm, converted to a letter grade (A+,A,A−, B+, . . . ,D+,D,D−,F). Thus, a building's entire AC power distribution system may receive a letter grade, based on the average value of the "as-found" condition of all tested AC power elements.

DETAILED DESCRIPTION

Figure 1:
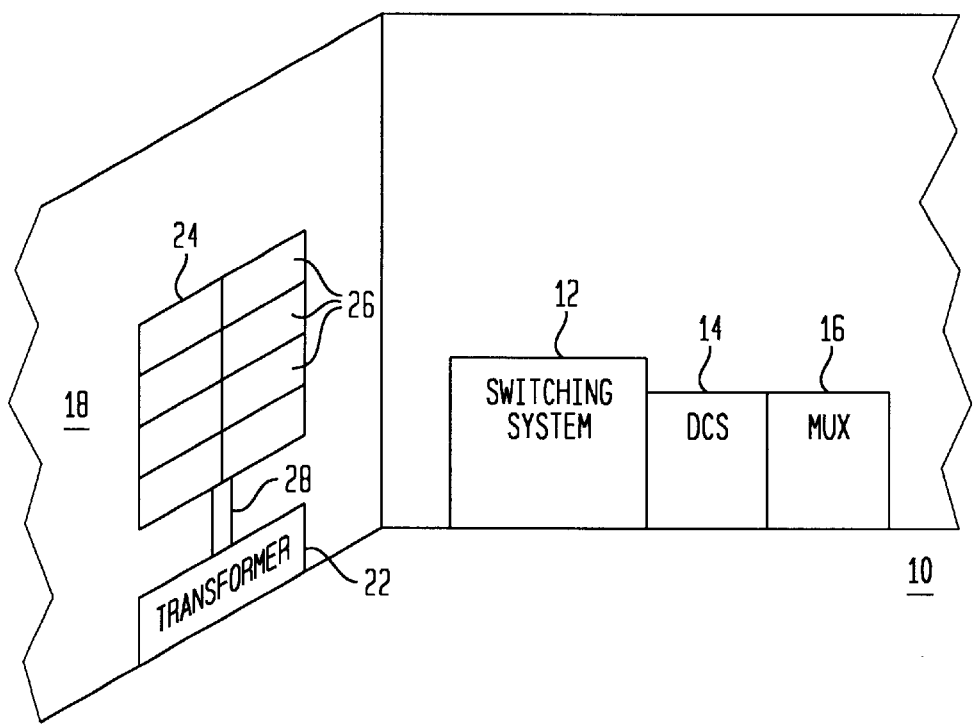
FIG. 1 shows a portion of a telecommunications facility that includes one or more pieces of telecommunications equipment and one or more pieces of power equipment.

FIG. 1 depicts a portion of a typical telecommunications facility 10 according to the prior art. The facility 10 typically includes one or more pieces of telecommunications equipment, such as a switching system 12, a Digital Cross-Connect System (DC) 14 and a Multiplexer (MUX) 16. In practice, the facility 10 may include multiple pieces of such equipment, as well as other pieces of equipment (not shown).

For the most part, each piece of telecommunications equipment, such as the switching system 12, the DCS 14 and the MUX 16, requires alternating current (AC) power for operation. Typically, an electric utility (not shown) supplies the AC power to the various pieces of telecommunication equipment within the facility through a distribution network 18. The distribution network 18 includes one or more pieces of power equipment, such as a transformer 22, and an electrical panel 24, containing a plurality of circuit breakers 26—26, supplied with AC power from the transformer via an electrical bus 28. Each of the circuit breakers 26—26 supplies power to one or more of pieces of telecommunications equipment through various electrical busses (not shown).

To ensure high reliability and quality, the telecommunications service provider responsible for the facility 10 typically undertakes periodic evaluation and maintenance of the various pieces of telecommunications equipment. In addition, some telecommunications service providers, such as AT&T, also undertake periodic evaluation and maintenance of the various pieces of power equipment within the distribution network 18, such as the transformer 22, the circuit breakers 26—26, and the electrical bus 28. Just as one or more pieces of telecommunications equipment sometimes fail, one or more of the pieces of power equipment can also fail, often with disastrous consequences. For example, the transformer 22 may supply the AC for all, or a large number of pieces of telecommunications equipment. Failure of the transformer 22 could potentially black-out all, or a large portion, of the facility 10 whereas failure of a single piece of telecommunications equipment, while disruptive, may have far less reaching consequences.

Presently, comprehensive evaluation of the various pieces of power equipment comprising the electrical distribution network 18 has proven cumbersome. In practice, a technician typically gathers information about the various pieces of equipment in the distribution network by hand, and then often records such information on paper. Even after collecting the information, the technician still may not know whether each piece of power equipment is operating properly. Moreover, even if a technician is able to determine that a particular piece of equipment is not operating properly, the technician may not necessarily know the impact of the piece of equipment on the facility 10. As a consequence, the technician may expend unnecessary effort to repair or replace the equipment immediately, when in fact, such maintenance could be deferred. Alternatively, the technician may presume that such maintenance need not occur immediately, when in fact, the impact of such a piece of power equipment is so significant as to warrant its immediate repair or replacement.

Figure 2:
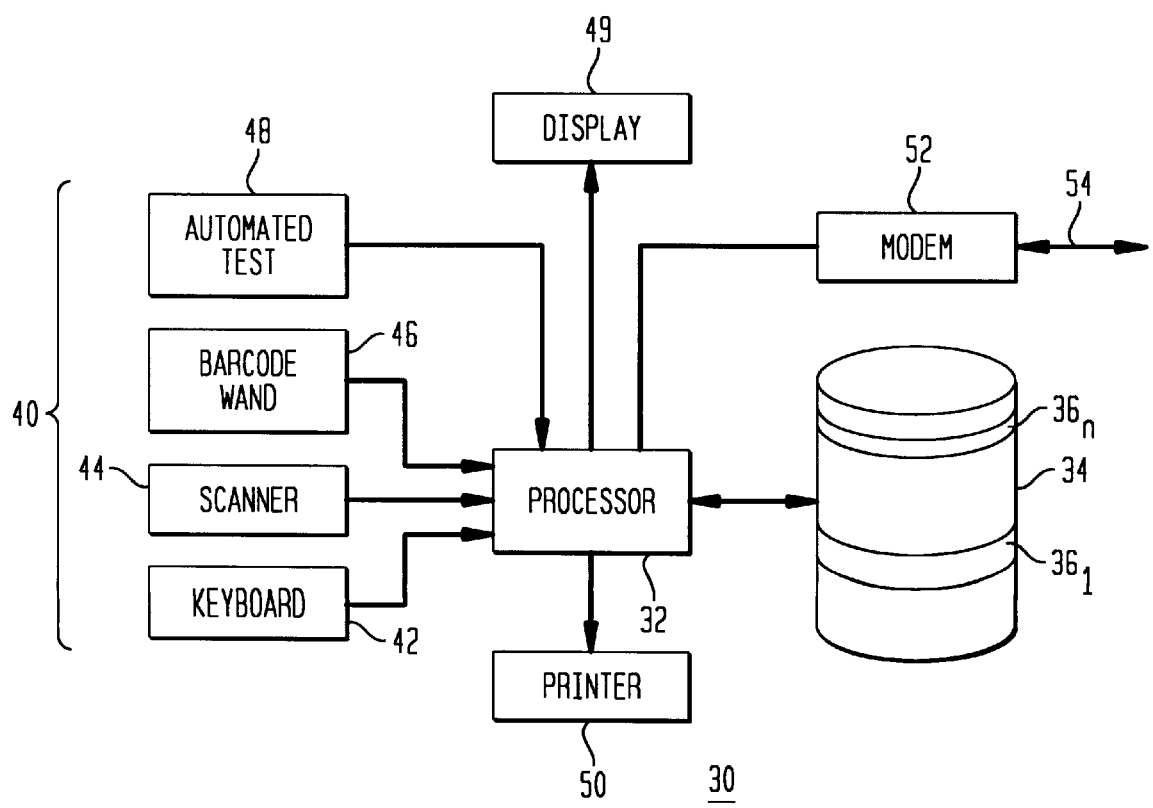
FIG. 2 shows a system, in accordance with the invention for evaluating and maintaining the pieces of power equipment of FIG. 1.

FIG. 2 discloses a system 30, in accordance with a preferred embodiment of the invention, for evaluating the various elements of the distribution network 18, such as the transformer 22, the panel 24 of circuit breakers 26—26, and the electrical bus 28, all of FIG. 1. The system 30 includes a processor 32, typically a personal computer or the like. Linked to the processor is a data base 34 that contains a plurality of records $36_1$–$36_n$, where n is an integer>zero. In practice, the data base 34 comprises a mass storage device, such as a magnetic disk drive (not shown) that may be integral with the processor 32, and a data base management program (not shown) executed by the processor to manage access to, and updating of, the records $36_1$–$36_n$ stored by the mass storage device.

Table I below depicts a typical record $36_i$ (where i is an integer<n)

| Element Module | ID Number | Equipment Type | Manu-facturer's Spec. |
|---|---|---|---|
| Circuit Breaker | 11-001 | XYZ Low Volt Breaker | x, y, z |
| Transformer | 3-001 | ABC Oil Filled Transformer | a, b, c |

For ease of administration, the records $36_1$–$36_n$ are separated into modules in accordance with the particular type of power equipment. Thus, the records associated with each of the various low voltage air circuit breakers are grouped into one module while the records of the high voltage air circuit breakers are grouped in a different module. Similarly, dry and liquid-type transformers are similarly separated in different modules.

Referring to FIG. 2, the processor 30 receives information, such as the entry of all or part of one or more of the records $36_1$–$36_n$, via one or more of a set of input devices 40. The input devices 40 may include a keyboard 42 though which a technician may manually input data to the processor 30. Further the input devices 40 may include a scanner 44 for scanning documents, such as a manufacturers' literature containing specifications for various pieces of power equipment. Additionally, the input devices 40 may include a bar code wand 46 for reading a bar code representing the identity of a particular piece of power equipment. Finally, the input devices 40 may also include an automated test device 48 for automatically determining the actual operating parameters of a piece of power equipment. For example, the automated test device 48 could include a digital volt-ohm meter for measuring voltage or current and for providing a suitable output signal of a particular format, such as RS-232, for receipt by the processor 30.

As shown in FIG. 2, the processor 30 provides output information, typically, all or part of one or more of the records $36_1$–$36_n$, to a display 49, such as a video monitor, or an active matrix display panel. Additionally, the processor 30 may also provide information to a printer 50. Further, the processor 30 may provide output information, via a modem 52 coupled to a telephone line 54. (Note the processor 30 may also receive information via the modem 52 as well.) In place of, or in addition to the modem 30, the processor 30 may also be linked to a data network (not shown) via a suitable data network interface, such as a LAN circuit card as known in the art.

The processor 30 has the capability of transferring information between the internal storage medium, i.e., the data base 34, and an external storage medium such as a floppy disk drive or removable storage medium (not shown). Upon command, the processor 30 copies, or moves, building specific data from (or to) the computer fixed disk to (or from) the computer floppy disk. This technique is employed not only to ensure essential data backup, but to transfer (copy or move) data from one computer to another.

Figure 3A:
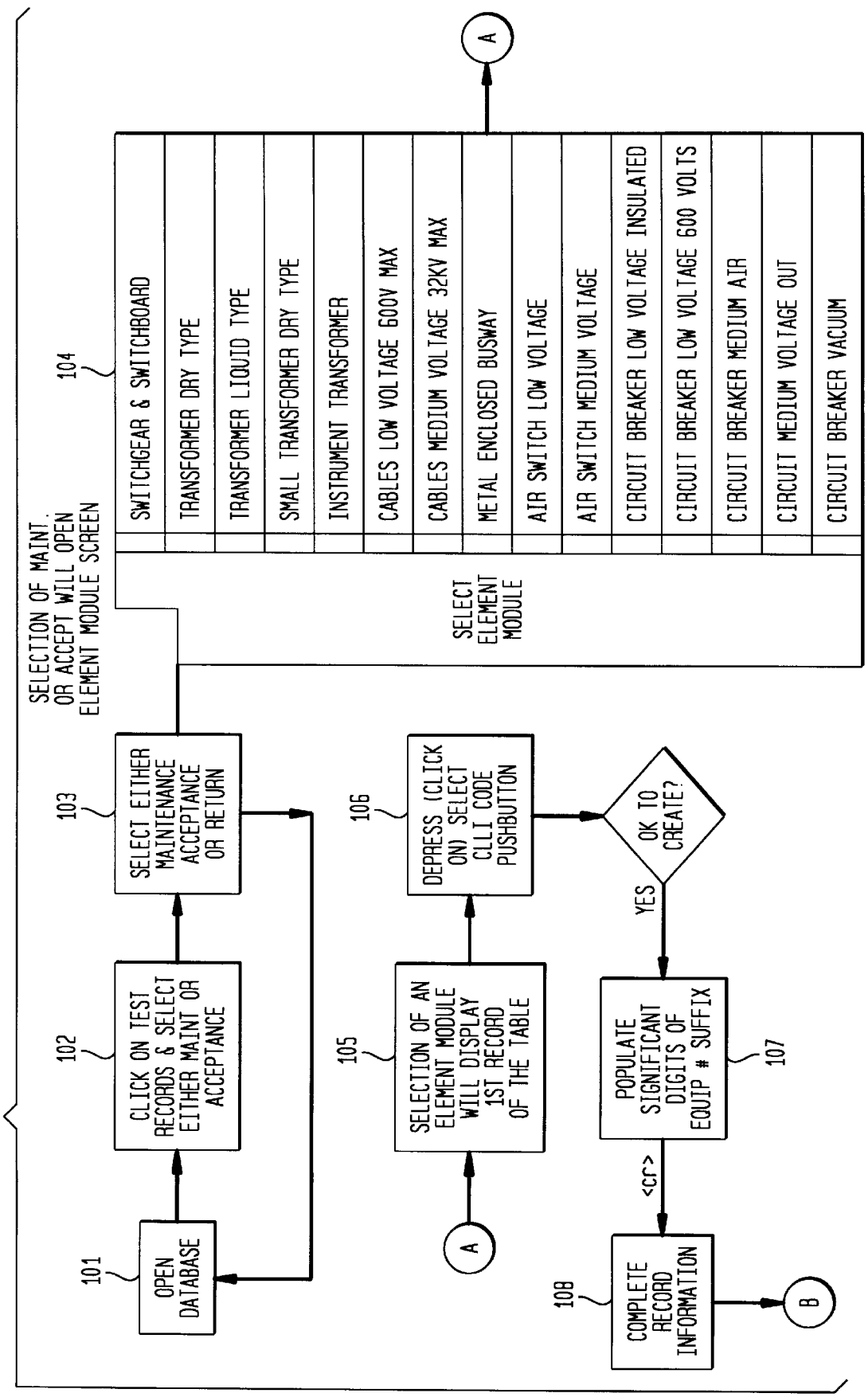
FIG. 3 illustrate in flow chart form, a program executed by the system of FIG. 2 to evaluate the pieces of power equipment of FIG. 1.
Figure 3B:
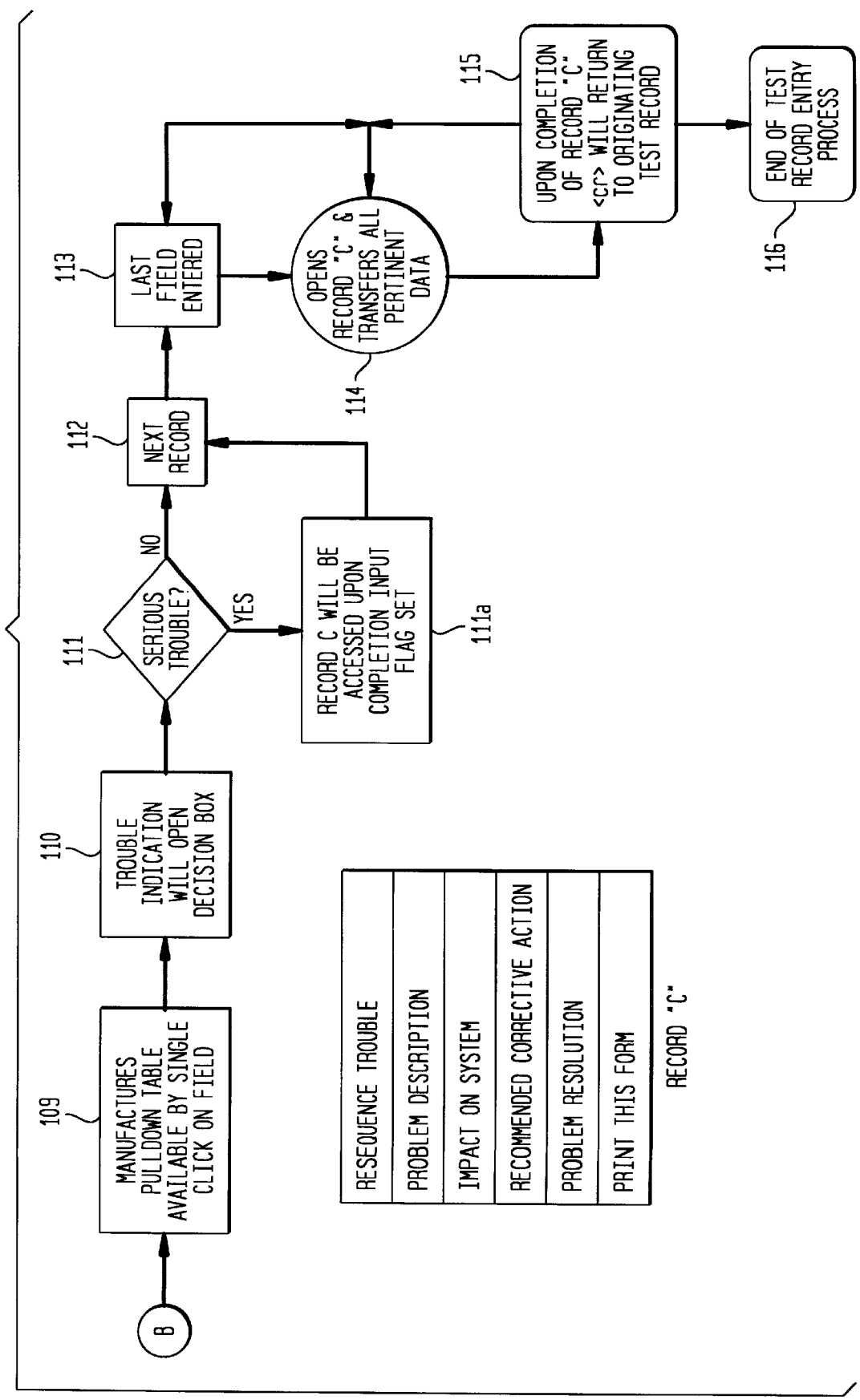

FIG. 3 depicts in flow-chart form, the steps of the process executed by the processor 30 of FIG. 2 to evaluate the various pieces of power equipment within the distribution network 18 of FIG. 1. Referring to FIG. 3, the process commences upon execution of step 101, with opening of the data base 34 of FIG. 2. Opening of the data base during step 101 is accomplished by executing the database management program stored in the processor 30 of FIG. 2 to display, via display 49 of FIG. 2, a main menu. Prior to execution of step 101, a technician must necessarily load the database management program, which may be a commercial database management program such as Paradox, if such program is not resident in the processor 30. Also, to the extent that the data base 34 of FIG. 2 isn't fully populated with the records $36_1$–$36_n$ of FIG. 2, a technician normally activates a download of the building specific equipment inventory (survey) data from a floppy disk. Once this is complete, the initiation of each new test record will automatically transfer pertinent field information into the test record from the survey module, in advance of step 101 of FIG. 3.

Following step 101, the technician executes step 102 and selects from a dialog box enabling him, or her, the ability to choose records for either maintenance or acceptance testing, and corresponding evaluation. Next, having executed step 103, the technician is presented with a menu of either maintenance, or acceptance, testing components. As will be discussed in greater detail below, a technician, having selected an equipment component, reviews a selected record for maintenance, or acceptance, evaluation by opening the record to verify the flagged data entries. These data are automatically flagged by the system following data input, when the program compares the manufacturer's, or Standards organization, operating parameters with those specified in the actual test data, for the corresponding piece of equipment. Likewise, a technician reviews a particular record for acceptance by opening the record and then reviewing the contents of the record for completeness. Alternatively, at any time, the technician may easily return to the main menu in step 101.

Following step 103, the processor 30 of FIG. 2 executes step 104 of FIG, 3 and supplies data to the display 49 to effect a display of each of the various modules (groups of equipment pieces) within the distribution network 18 of FIG. 2, representing the records $36_1$–$36_n$ in the data base 34 of FIG. 2. After step 104, program execution follows branch A, whereupon, the technician executes step 105 and selects a module containing equipment of a specific type or technology. Upon selecting the particular module (step 105), the record of the first piece of equipment, of that technological type, is displayed. After observing the first record in the selected module, the technician may choose to modify, add, or delete recordinformation. The technician indicates a desire to access data from another building location by initiating a building search-and-select command (pushbutton) (step 106). Once the technician has decided to populate a new equipment record, for the building location of choice, he, or she, continues with step 107 by specifying the appropriate significant digits to enable the system to construct the equipment identification code. Thereafter, the inventor proceeds to complete data entry of all remaining fields of the test record (step 108). During the test record data entry process, the technician executes step 109 to access an equipment manufacturer's table. Double clicking on the manufacturer's field opens a manufacturer's table, and, each entered character causes the system to display the closest matching manufacturer name. Single clicking on any displayed name selects the specific equipment manufacturer for the current equipment record. Step 110 is executed following step 109, whereupon the technician, having entered a description of equipment trouble, views a system generated inquiry as to the seriousness of the trouble. Data entry at key fieldscompares the manufacturer's, or Standard's organization, permissible range of operating parameters to actual operating parameters for the actual piece of equipment, to determine if there is trouble. The technician may make this comparison manually, or alternatively, the processor 30 of FIG. 1 could make the comparison for the technician if the actual operating parameters were loaded into the data base 34 of FIG. 1. As discussed previously with respect to FIG. 2, the manufacturer's and/or Standards Organization permissible operating parameters could be manually entered via the keyboard 42 or scanned in via the scanner 44. The technician may enter the actual operating parameters to the processor via keyboard 42, or alternatively, the automated test device 48 may obtain such parameters automatically.

In some instances, a technician may want to verify that a particular piece of equipment is not functioning properly by re-inputting test data control parameters, such as the temperature (° C.) of the environment at the time of an insulation resistance test, to enable the system to automatically recalculate the corrected MegOhm values.

Following step 110, step 111 is executed, requesting an assessment regarding the seriousness of the trouble. Stated another way, the processor 30 flags out-of-compliance data to enable an intelligent determination of the impact of the trouble relative to the distribution network 18 of FIG. 1. For example, a circuit breaker 26 (see FIG. 1) whose operating parameters are outside the manufacturer's specifications may have little impact if the breaker controls an ancillary piece of telecommunications equipment. Conversely, a circuit breaker may have a significant impact if that breaker controls an essential piece of telecommunications equipment, such as switching system 12, for example, or if it controls a number of pieces of equipment. If the trouble is serious, then, following step 111, step 111a is executed, and the record associated with the piece of equipment is flagged to initiate creation of a new record "C", representing a detailed "trouble" report for the piece equipment judged as having a significant impact on the distribution network 18 of FIG. 1. Following step 111a, or following step 111 if the trouble is not serious, the processor 30 executes step 112 to prompt the technician to select the next record in the module. (If there are no more records in a particular module, the technician exits that module and selects the next AC power distribution element, for the chosen building testing location.)

If, after execution of step 112, there are no more fields of the active record, the processor 30 of FIG. 2 executes step 114 and opens the newly created "C" record. In opening new "C" records, the processor 30 transfers to that record pertinent information about the corresponding piece of equipment. Such information may include the identification of the piece of equipment, its description of trouble, impact on the distribution network 18, and any corrective action suggested by the processor 30 of FIG. 2. Upon opening of the "C" record, the technician can populate the record with additional information indicative of whether the technician re-sequenced (re-tested) the piece of equipment, as well as a description of the problem, a recommended corrective action, and a problem resolution statement. The technician can also update any information in the record, including the impact of the piece of equipment on the distribution network 18 of FIG. 1, as well as the recommended corrective action. Additionally, the technician can also enter information regarding what steps were taken to resolve the problem. If desired, the technician can command the printer 50 to display, for review and/or printout, the contents of this urgent action equipment report.

Following step 114, the processor executes step 115 and returns to the originating record $36_i$, that is, the record corresponding to the piece of equipment whose associated "C" record was previously opened. The purpose in returning to the originating record is to allow the technician to get any information necessary to take the appropriate corrective action as required, as well as to continue the entry of test data for the chosen building. For example, the technician may want to return to the originating record to confirm the location of the piece of equipment, or its particular manufacturer. After step 115, program execution branches back to step 114 if additional "C" records are required. If such is not the case, the program execution ends (step 116).

The foregoing discloses a technique for evaluating elements of infrastructure equipment (e.g. AC power distribution equipment) by comparing their operating parameters to those of the manufacturer and/or a Standards organization, and if there is a deviation, then determining the necessary corrective action based on the impact of that equipment failure.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for evaluating pieces of building infrastructure equipment, comprising the steps of:
    (a) storing, in a data base, for each piece of equipment, a record containing an associated identification, and an operating tolerance specification, designating an acceptable range of operating parameters;
    (b) selecting said each piece of said infrastructure equipment for evaluation by retrieving from said data base said identification and corresponding operating tolerance specification for said each piece of equipment;
    (c) evaluating said selected piece of equipment by conducting a test of current operating parameters to determine if said selected equipment piece has each of its operating parameters within the specified acceptable range, and if not, then
        (i.) assessing what impact said selected piece of equipment has on the distribution network when said selected piece of equipment has at least one operating parameter outside the specified acceptable range;
        (ii.) taking corrective action on said selected piece of equipment in accordance with the impact; otherwise,
    (d) selecting another of said pieces of equipment; and
    (e) repeating steps (a)–(d) until said equipment pieces have been selected.

2. The method according to claim 1 wherein the operating tolerance specification corresponds to a manufacturer's tolerance specification.

3. The method according to claim 1 wherein the evaluating step includes the step of determining twice in succession if said selected equipment piece has each of its operating parameters within the specified acceptable range.

4. The method according to claim 1 wherein the corrective action is taken immediately if the impact is serious.

5. The method according to claim 1 wherein the corrective action is taken during a future-scheduled maintenance interval when the impact is not serious.

6. The method according to claim 1 further including the step of creating, during the evaluation step, a trouble record indicative for the piece of equipment whose operating parameter is outside the specified acceptable range.

7. A system for evaluating pieces of infrastructure equipment in a distribution network, comprising,
    a data base storing a record for each piece of equipment containing an associated identification and an operating tolerance specification specifying an acceptable range of operating parameters; and
    a processor for retrieving from said data base said identification and corresponding operating tolerance specification for a selected piece of equipment; evaluating said selected piece of equipment by determining if said selected equipment piece has each of its operating parameters within the specified acceptable range; and if not, then
        (i.) determining what impact said selected piece of equipment has on the distribution network when said selected piece of equipment has at least one operating parameter outside the specified acceptable range;
        (ii.) specifying corrective action on said selected piece of equipment in accordance with the impact.

8. The system according to claim 7 including at least one input device connected to the processor for providing input data thereto indicative of piece of equipment.

9. The system according to claim 8 wherein the input device comprises a keyboard though which a technician may manually input data corresponding to each piece of equipment.

10. The system according to claim 8 wherein the input device comprises a scanner for scanning documents including manufacturers' literature containing operating tolerance specifications for said pieces of equipment.

11. The system according to claim 8 wherein the input device comprises a bar code wand for reading a bar code representing the identity of a particular piece of power equipment.

12. The system according to claim 8 wherein the input device comprises an automated test device for automatically determining the actual operating parameters of a piece of power equipment.

13. The system according to claim 7 wherein the data base also stores, for each piece of equipment having at least one operating parameter outside the acceptable range, a trouble record for that piece of equipment.

14. The system according to claim 13 wherein the trouble record includes a description indicative of a problem associated with the piece of equipment.

15. The system according to claim 13 wherein the trouble record includes information on the impact of the piece of equipment on the distribution network.

16. The system according to claim 13 wherein the trouble record includes information on a recommended corrective action.

17. The system according to claim 13 wherein the trouble record includes information related to problem resolution.

* * * * *